(12) United States Patent
Knauerhase et al.

(10) Patent No.: US 7,222,175 B2
(45) Date of Patent: May 22, 2007

(54) DYNAMICALLY CONFIGURABLE BEACON INTERVALS FOR WIRELESS LAN ACCESS POINTS

(75) Inventors: Robert C. Knauerhase, Portland, OR (US); Abhay A. Dharmadhikari, Beaverton, OR (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1201 days.

(21) Appl. No.: 10/086,915

(22) Filed: Feb. 28, 2002

(65) Prior Publication Data

US 2003/0163579 A1 Aug. 28, 2003

(51) Int. Cl.
*G06F 15/16* (2006.01)
(52) U.S. Cl. ..................................................... 709/225
(58) Field of Classification Search ................. 709/225, 709/229, 236, 230; 370/230
See application file for complete search history.

(56) References Cited

U.S. PATENT DOCUMENTS

| | | | | |
|---|---|---|---|---|
| 6,014,406 A | * | 1/2000 | Shida et al. ................. 375/133 |
| 6,088,591 A | * | 7/2000 | Trompower et al. ......... 455/438 |
| 6,813,260 B1 | * | 11/2004 | Fogle ........................... 370/338 |
| 2002/0071449 A1 | * | 6/2002 | Ho et al. ...................... 370/447 |
| 2002/0110085 A1 | * | 8/2002 | Ho et al. ...................... 370/230 |
| 2002/0167961 A1 | * | 11/2002 | Haartsen ...................... 370/444 |
| 2003/0002456 A1 | * | 1/2003 | Soomro et al. .............. 370/328 |
| 2003/0163569 A1 | * | 8/2003 | Panasyuk et al. ............ 709/227 |
| 2003/0193895 A1 | * | 10/2003 | Engwer et al. .............. 370/241 |
| 2004/0185889 A1 | * | 9/2004 | Shipman ...................... 455/517 |

* cited by examiner

*Primary Examiner*—Andrew Caldwell
*Assistant Examiner*—Stephan Willett
(74) *Attorney, Agent, or Firm*—Blakely, Sokoloff, Taylor & Zafman LLP

(57) ABSTRACT

A method is described for adaptive load-balancing and graceful termination of access points in a network having a plurality of access points. The method includes determining a need to reduce a load of a first access point, and increasing a beacon interval corresponding to the first access point in order to detract clients. Correspondingly, beacon intervals for other access points may be reduced in order to attract more clients.

9 Claims, 5 Drawing Sheets

DYNAMICALLY CONFIGURABLE BEACON INTERVALS FOR WIRELESS LAN ACCESS POINTS

COPYRIGHT NOTICE

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Intel Corporation, All Rights Reserved.

FIELD OF THE INVENTION

This invention relates to the field of wireless protocols, and more specifically, to a mechanism for terminating the services of an access point with minimal interruption to its clients.

BACKGROUND OF THE INVENTION

IEEE (Institute of Electrical and Electronics Engineers) 802.11 (hereinafter "802.11") is a family of specifications for wireless local area networks (WLANs), and was developed to maximize interoperability between differing brands of wired local area networks (LANs) as well as to introduce a variety of performance improvements and benefits.

The 802.11 standard defines over-the-air protocols that are necessary to support networking in a local area. A primary service of the 802.11 standard is to deliver MSDUs (MAC Service Data Units) between peer LLCs (Logical Link Controls). Typically, a radio NIC (network interface card) and access point (to be discussed) provide the functions of the 802.11 standard.

The 802.11 standard provides MAC (Media Access Control) and PHY (Physical Layer) functionality for wireless connectivity of fixed, portable, and moving stations moving within a local area. A station is a wireless node that contains functionality of the 802.11 protocol (i.e., MAC layer, PHY layer, and interface to a wireless medium). In its most basic form, stations communicate directly with each other on a peer-to-peer level sharing a given cell coverage area.

The 802.11 topology comprises components that interact to provide a wireless LAN that enables station mobility that is transparent to higher protocol layers such as the LLC, and may support topologies including the IBSS (Independent Basic Service Set) network and the ESS (Extended Service Set) network.

Whereas an IBSS is commonly referred to as an ad hoc network of BSSs, and is often formed on a temporary basis, an ESS comprises a series of BSSs (typically each comprising an AP) that are connected by means of a Distribution System (hereinafter "DS"), which can be almost any type of network, such as an Ethernet LAN, or the Internet, for example. Mobile nodes can then roam between APs and seamless campus-wide coverage is possible.

Both networks utilize a basic building block referred to as the BSS (Basic Service Set) that provides a coverage area whereby stations of the BSS remain fully connected. A station is free to move within a BSS, but it cannot communicate directly with other stations if it leaves the BSS. Typically, a BSS comprises an access point (hereinafter "AP"). The main function of an AP is to form a bridge between wireless and wired LANs. When an AP is present, stations do not communicate on a peer-to-peer basis. All communications between stations or between a station and a wired network client go through the AP.

The roaming provisions of 802.11 allow for clients to roam among multiple APs that can be operating on the same or separate channel, and provide for APs to transmit beacon signals to their clients. A beacon signal may include a number of parameters, such as a time stamp for client synchronization, a traffic indication map, and an indication of supported data rates, for example. Roaming clients can use the beacon information for a number of purposes. For example, if a client determines that an existing connection is weak, that the APs service has been downgraded, or that an AP is not available when needed, then the client can attempt to associate itself with a new AP.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
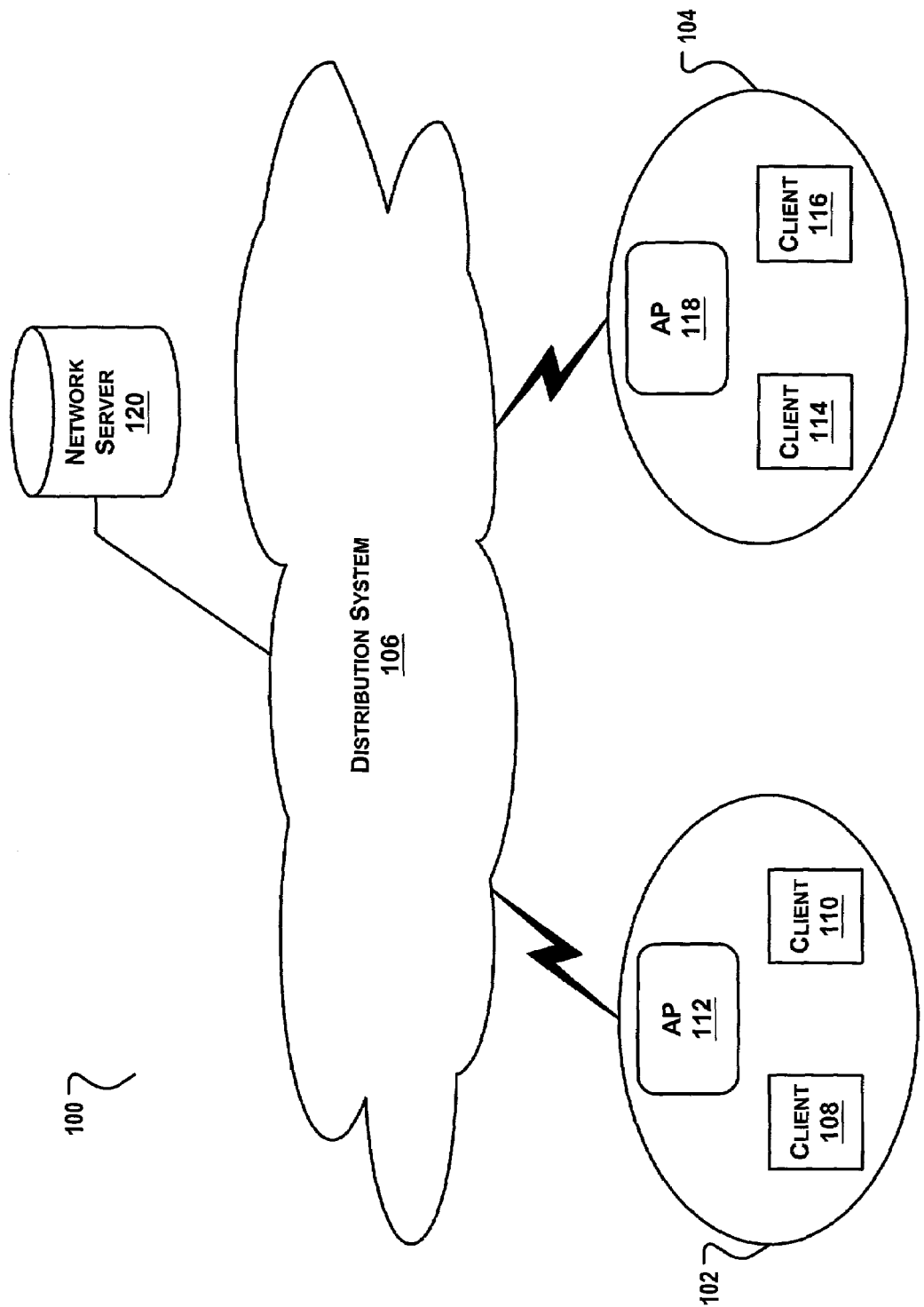
FIG. 1 is a block diagram illustrating a network in which embodiments of the invention can operate.

In one aspect of embodiments of the invention, a method for intelligently controlling beacon intervals of access points resulting in load balanced access points and graceful termination of service is disclosed. Given a set of access points in a network, each access point servicing a set of clients, when one access point has a need to downgrade its service to clients, for example to reduce its client load, or to terminate service (permanently or temporarily) for service, replacement, or upgrade, the beacon interval for that access point is increased such that clients naturally migrate to another access point for service.

Embodiments of the invention include various operations, which will be described below. The operations of these embodiments may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

Embodiments of the invention may be provided as a computer program product which may include a machine-readable medium having stored thereon instructions which may be used to program a computer (or other electronic devices) to perform a process according to embodiments of the invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, embodiments of the invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Under the current state of the art, APs transmit beacon signals to their clients at fixed intervals (sometimes initially configurable, but fixed thereafter), and clients listen for the beacon signals to obtain information and to make decisions. Furthermore, when an AP needs to reduce its service for reasons including overload and need for downtime, the AP may immediately and completely terminate service; downgrade service as its load increases; or refuse service to more than n contemporaneous clients, where n may be predetermined by the given AP.

Since clients have no forewarning that service will be terminated, downgraded, or unavailable, clients are likely to experience lagtime from the inconvenience of having to find another AP to service them. In embodiments of the invention, a dynamically configurable beacon interval time enables clients to naturally migrate away from an existing AP to another AP without experiencing the inconvenience associated with sudden termination of service, downgraded service, or unavailability of service.

Embodiments of the invention are described with reference to the IEEE 802.11 standard for wireless technologies. However, these embodiments are intended to be for illustrative purposes only, and are not intended to limit the invention to the embodiments described. In fact, one of ordinary skill in the art should understand its general applicability, as will be apparent from the described embodiments.

Dynamically Configurable Beacon Intervals

FIG. 1 illustrates an exemplary network within which embodiments of the invention are compatible. The network is an ESS network 100 which comprises one or more BSS networks 102, 104 connected via a distribution system 106, which can be any type of network, such as an Ethernet LAN, or the Internet, which enables the clients to roam from one AP (to be discussed) to another. The ESS may also comprise a network server 120 (to be discussed). Each BSS network 102, 104 comprises a plurality of wireless nodes 108, 110, 114, 116 ("clients") and an access point 112, 118 ("AP"). (Although not all BSS networks 102, 104 comprise an access point 112, 118 ("AP"), we will assume that the BSS networks 102, 104 discussed herein each comprise an AP 112, 118.)

Figure 2:
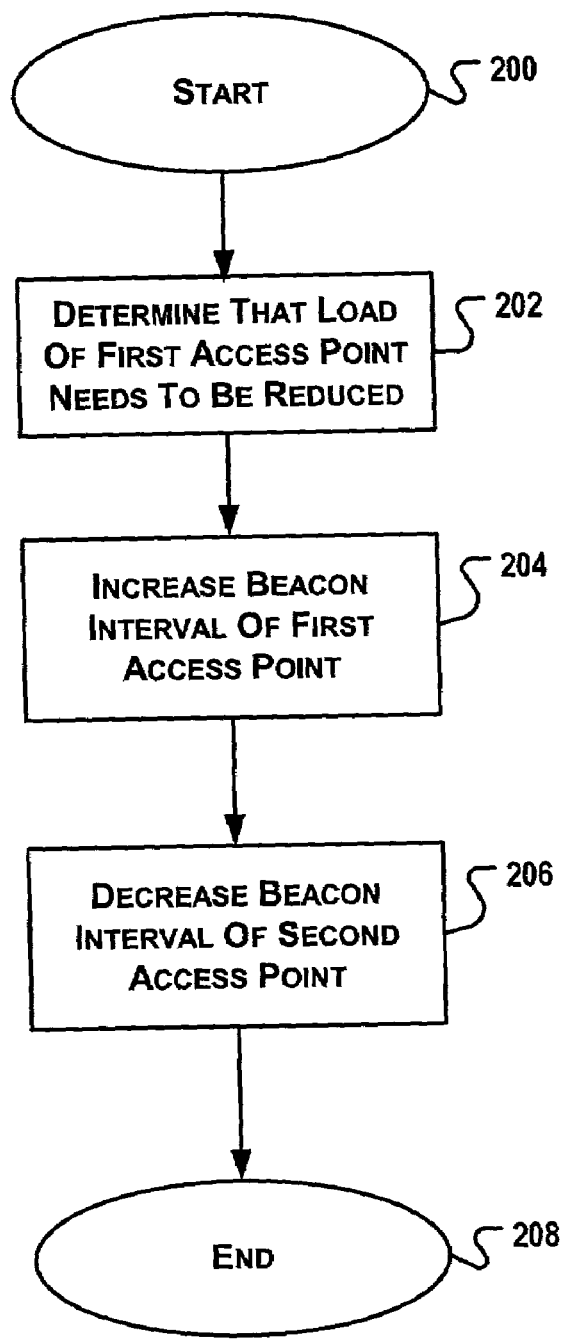
FIG. 2 is a flowchart illustrating a method in accordance with embodiments of the invention.

FIG. 2 is a flowchart illustrating a method in accordance with embodiments of the invention. It begins at block 200 and continues to block 202 where it is determined that a first access point in a network of access points needs to reduce its service load. The reduction in load can be a partial service load reduction, or it may be a complete service load reduction. A service load may comprise a target number of clients to service, or an operating capacity, for example.

At block 204, the beacon interval of the first access point is increased. By increasing the beacon interval of the first access point, the frequency at which the first access point sends out a beacon signal decreases, thereby making the first access point less available to clients. Consequently, clients currently receiving service from the first AP may listen for beacon signals from other access points in an attempt to migrate to another access point to obtain the service that it needs.

At block 206, the beacon interval of at least one second access point in the network may optionally be decreased, where a second access point is an AP that is not the first access point that increased its beacon interval. For example, the beacon interval for one or more second access points may be decreased if clients are not migrating away from the first access point fast enough. By decreasing the beacon interval of at least one second access point in the network, the frequency at which those second access points send out beacon signals increases, thereby making the second access points more available to clients. As a result, the probability that any of the second access points will be found by any of the clients in the network, including those that had been serviced by the first AP, increases. The second access points may then acquire none, some, or all of the first access point's clients. The method ends at block 208.

Figure 3:
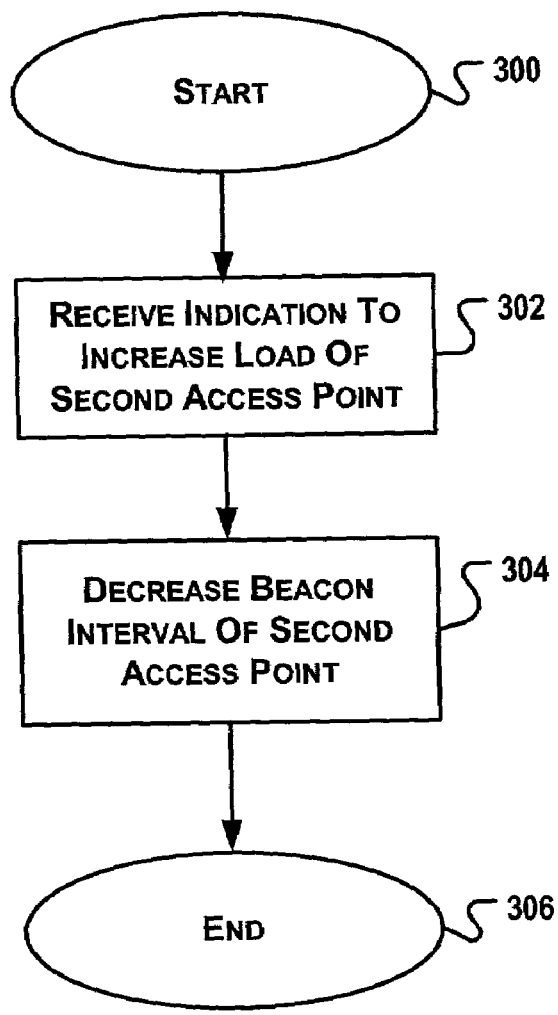
FIG. 3 is a flowchart illustrating another method in accordance with embodiments of the invention.

FIG. 3 is a flowchart illustrating another method in accordance with embodiments of the invention. The method begins at block 300 and continues to block 302 where a second access point receives an indication to increase its load. At block 304, the beacon interval of the second access point is decreased. The method ends at block 306.

Determining the Beacon Interval

The beacon interval can be determined by any number of algorithms as anyone of ordinary skill in the art could implement. For example, to set a beacon interval for a shutdown, an algorithm could be implemented that would increase an APs interval time by one and a half for the first third of the time prior to shutdown, and then by double the interval time for the second third of the time prior to shutdown, and then by three times the interval time for the last third of the time prior to shutdown.

Thus, if $AP_X$ has a normal interval time of 5 minutes, and it needs to be shut down 12 hours from a given time, the above algorithm would increase the interval time to 7.5 minutes for the first 4 hours; 10 minutes for the next 4 hours; and 15 minutes for the last 4 hours. A similar algorithm could be determined for decreasing a beacon interval.

Figure 4:
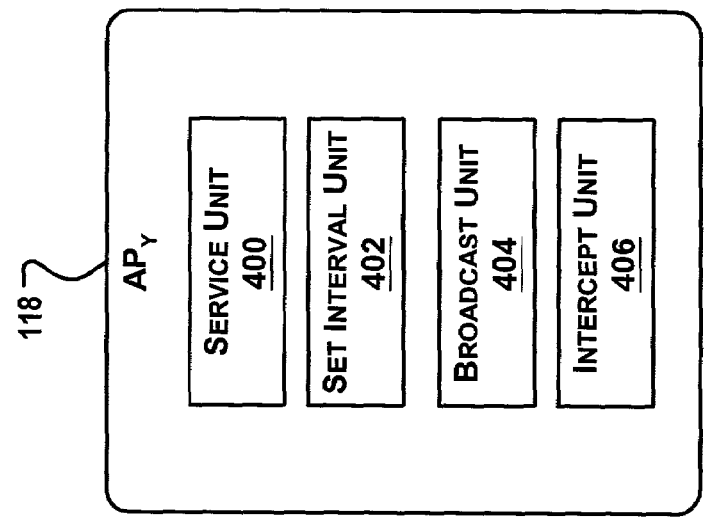
FIG. 4 is a block diagram illustrating access points in accordance with embodiments of the invention.
Figure 4:
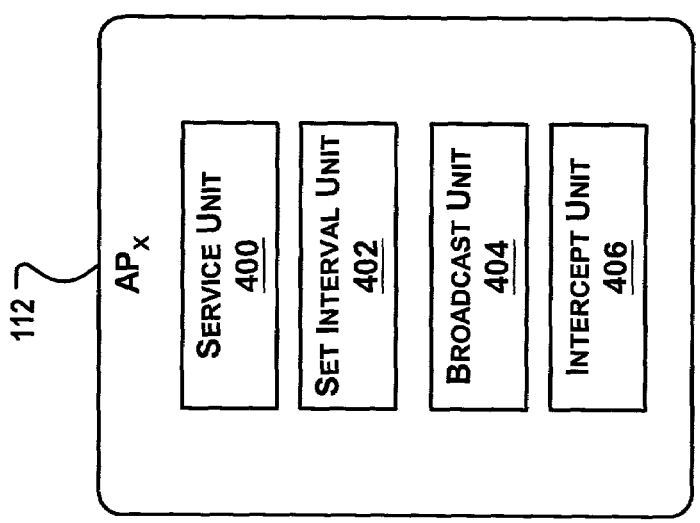

As illustrated in FIG. 4, the beacon interval can be determined amongst multiple APs 112, 118 in a network (only 2 shown, $AP_X$ and $AP_Y$), where each AP 112, 118 comprises a service unit 400, a set interval unit 402, a broadcast unit 404, and an intercept unit 406 for coordinating beacon intervals for the APs 112, 118 in the network. For instance, a service unit 400 of $AP_X$ 112 could determine that $AP_X$ needs to be shutdown for replacement, and schedules $AP_X$ 112 to be shutdown at a future time. To prepare for shutdown, a set interval unit 402 of $AP_X$ 112 increases its beacon interval as determined by a predetermined algorithm, an example of which is discussed, supra.

Furthermore, a broadcast unit 404 of $AP_X$ maintains capacity information for $AP_X$, including its current load (i.e., number of clients, operating capacity, and its beacon interval). The broadcast unit 404 may convey capacity information to an intercept unit 406 of other APs in the network so that if they have the capacity to service more clients, they may decrease their beacon intervals in an effort to attract more clients. Thus, for example, an intercept unit 406 of $AP_Y$ intercepts the information and a set interval unit 402 of $AP_Y$ decreases its beacon interval in accordance with the load it can handle. $AP_Y$'s broadcast unit 404 may then broadcast $AP_Y$'s capacity information to the other APs in the network so that they can determine if they can increase their load and decrease their beacon intervals accordingly.

Alternatively, a centralized system for coordinating beacon intervals may be implemented, where the centralized system comprises a set interval unit to determine which one or more AP's beacon interval to change, what to change the beacon intervals to, and when to change them. The centralized system can then broadcast beacon interval information to the APs in the network via a broadcast unit.

Figure 5:
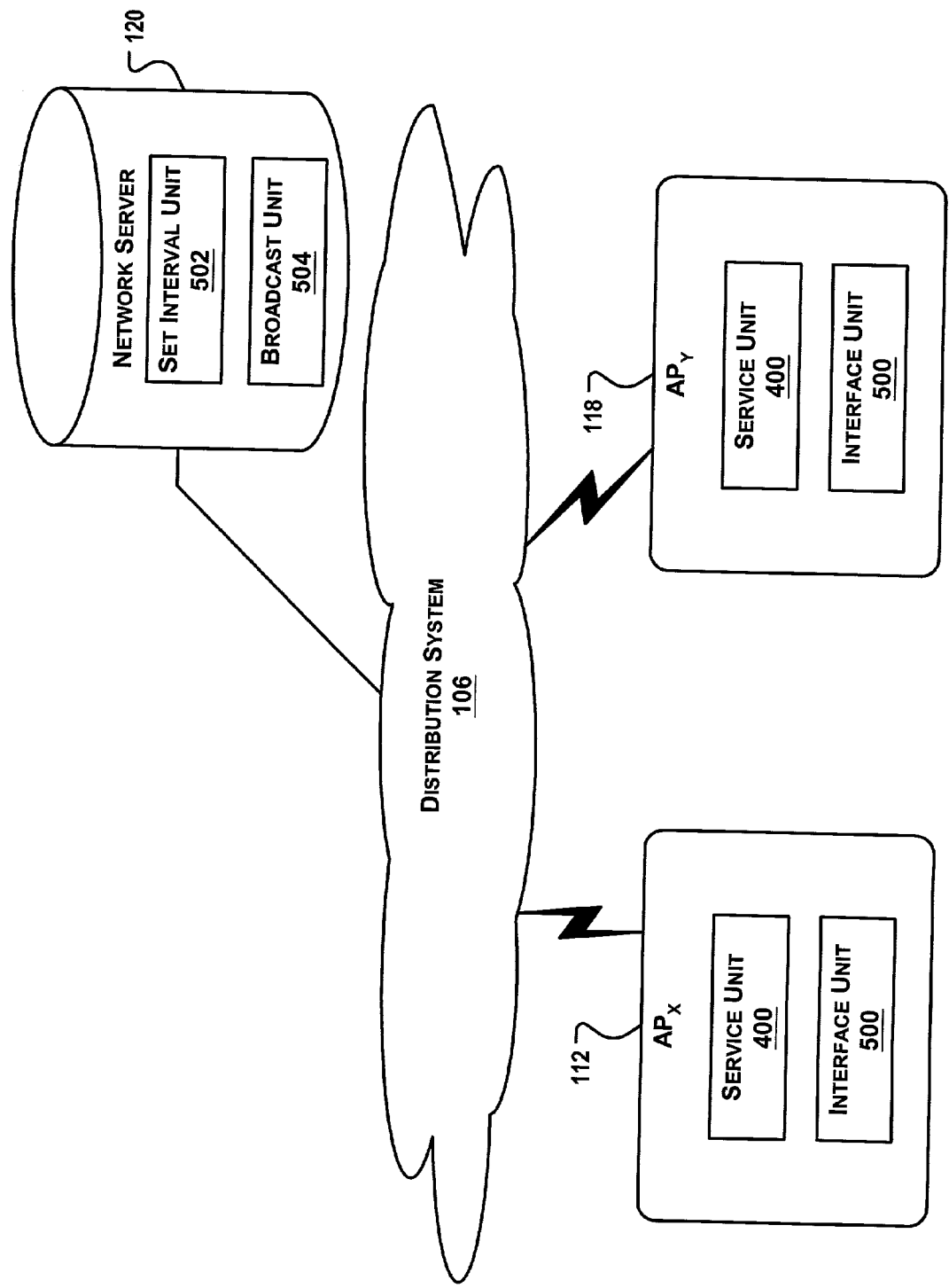
FIG. 5 is a flowchart illustrating a detailed system in accordance with embodiments of the invention.

For example, as illustrated in FIG. 5, $AP_X$ 112 may comprise a service unit 400 to determine when it needs to be shutdown. An interface unit of $AP_X$ 500 relays this information to a set interval unit 502 of a network server 120 to be scheduled for shutdown at some future time. The set interval unit 502 determines an appropriate amount by which to increase $AP_X$'s beacon interval and conveys it back to $AP_X$ for $AP_X$.

Other APs in the network may comprise an interface unit 500 to send information, such as an APs capacity, including its beacon interval, to the network server's 120 set interval unit 502. Based on the capacity information, the set interval unit 502 of the network server 120 may calculate a decreased beacon interval for a given AP and send that information to the AP.

A broadcast unit 504 of the network server 120 may broadcast each APs beacon interval information to other APs so that they may send their capacity information to get a new beacon interval.

Periodically Increasing Beacon Interval of First Access Point

If it is determined that the first access point still needs to reduce its load, its beacon interval can be increased again. Likewise, if it is determined that any of the second access points can increase their loads, any number of those second access points in the network can subsequently decrease their beacon intervals.

The process of increasing the beacon interval of the first access point, and decreasing the beacon interval of any of the second access points may continue individually, or in tandem, until it is determined that the first access point reaches a point when it no longer needs to reduce its load. Depending on the application, the first access point may reach this point when some threshold condition is satisfied. A threshold condition may comprise the offloading of a specified number of clients (or, conversely, the servicing of a target number of clients), or the attainment of a measurement of operating capacity (such as percentage), for example.

Furthermore, the times at which the intervals are increased and/or decreased may be predetermined, or dynamically determined. For example, if the first access point is attempting to reduce its load, it may increase its beacon interval at time t, and check at predetermined time t+1 if its load is still too heavy. If it is, then at time t+1, its beacon interval may be increased again. This process may repeated at time t+2, and so forth, until the threshold condition is satisfied.

Alternatively, a time may be a dynamically determined time that is based on an algorithm which determines if a threshold condition has been satisfied, and if it has not been satisfied, the beacon interval may be increased. For example, if the first access point needs to offload all of its clients for an upgrade, for example, the set interval unit of the first access point may determine that the beacon interval needs to be increased if the first access point is still operating above a predetermined threshold, say 70% operating capacity.

Returning to Normal Beacon Interval

After some period of time, the first access point may decide to increase the number of clients it can service, or to increase its current operating capacity. For example, servicing may be completed on the first access point, or the first access point has the capacity to service more clients. This time may be a predetermined time, at which time the first access point will decrease the intervals at which it sends out beacon signals, thereby gaining more clients; or this time may be dynamically determined, such as by a set interval unit that determines that the first access point can service more clients, or that determines that the upgrade, service, or some other operation has been completed on the first access point.

At this time, the first access point can then decrease its beacon interval in a way that is similar to the process for gradually increasing the beacon interval, discussed supra. For example, an AP may gradually decrease its beacon interval until a threshold condition, such as its normal operating capacity, or its normal beacon interval, is satisfied.

First Exemplary Embodiment

In one exemplary embodiment, dynamically configurable beacon intervals may be used to assist in load-balancing between co-located access points. For example, a data hotspot at an airport gate area might have three APs, ($AP_X$, $AP_Y$, $AP_Z$) to serve a given physical area. In order to even out the load on each AP, one of the APs, $AP_Y$, could extend its beacon interval to several hours, allowing the AP to "hide" from clients. Clients looking for service could then find another AP such as $AP_X$ or $AP_Z$. After some time, $AP_Y$ would reduce its beacon interval back to normal, and $AP_X$ might then extend its period in order not to attract new clients.

Second Exemplary Embodiment

In a second exemplary embodiment, dynamically configurable beacon intervals are useful in allowing an AP to gracefully exit before some planned event, such as a periodic service, replacement, or upgrade. If an AP is scheduled for downtime, it could lengthen its beacon interval as that time approaches; in this manner, existing clients of this AP will naturally migrate away, and the chance that new clients will discover this AP lessens as the interval grows. Thus, when the scheduled time approaches, a minimum of clients are inconvenienced by the loss of service.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, in this description, while units, such as the service unit set interval unit, broadcast unit, etc., have been described as if each was a single module, it should be understood by one of ordinary skill in the art that such description is made to facilitate explanation, and is not intended to be limiting in any manner. Therefore, while in some embodiments, the units may each be distinct modules, in other embodiments, their functionalities may be combined as appropriate. Except where noted, the functionality described herein is not limited to any particular device.

Furthermore, while embodiments of the invention describe increasing the beacon interval for a first access point, and decreasing the beacon interval for a second access point, it should be understood that embodiments of the invention are also applicable in situations where the first access point may need to increase its service load so that its beacon interval may be decreased. In these situations, a second access point may then increase its beacon interval to detract clients.

What is claimed is:

1. A method comprising:
   maintaining load capacity information relating to access points in a network, the access points are assigned beacon intervals to facilitate balancing of loads associated with the access points;
   determining whether to adjust a first load associated with a first access point of the access points, the first access point corresponding to a first beacon interval of the beacon intervals; and
   modifying the first beacon interval to adjust the first load associated with the first access point until a first load balancing threshold condition is met.

2. The method of claim 1, wherein the adjusting of the first load comprises one or more of decreasing the first load and increasing the first load.

3. The method of claim 2, further comprising whether to adjust a second load associated with a second access point corresponding to a second beacon interval, and modifying the second beacon interval to adjust the second load associated with the second access point until a second load balancing threshold condition is met.

4. The method of claim 2, further comprising further setting the first load to automatically increase or decrease at a future time according to a predetermined time period.

5. The method of claim 1, wherein the first load balancing threshold condition comprises reaching an operating capacity.

6. The method of claim 1, wherein the first load balancing threshold condition comprises providing service to a target number of clients.

7. A computer-readable medium comprising instructions which, when executed, cause a machine to:
   maintain load capacity information relating to access points in a network, the access points are assigned beacon intervals to facilitate balancing of loads associated with the access points;
   determine whether to adjust a first load associated with a first access point of the access points, the first access point corresponding to a first beacon interval of the beacon intervals; and
   modify the first beacon interval to adjust the first load associated with the first access point until a first load balancing threshold condition is met.

8. The computer-readable medium of claim 7, wherein the instructions when executed to adjust the first load further cause the machine to perform one or more of decreasing the first load and increasing the first load.

9. The computer-readable medium of claim 7, further comprising setting the first load to automatically increase or decrease at a future time according to a predetermined time period.

* * * * *